Nov. 16, 1937.  G. A. LYON  2,099,212
BUMPER GUARD
Filed July 30, 1935   2 Sheets-Sheet 2
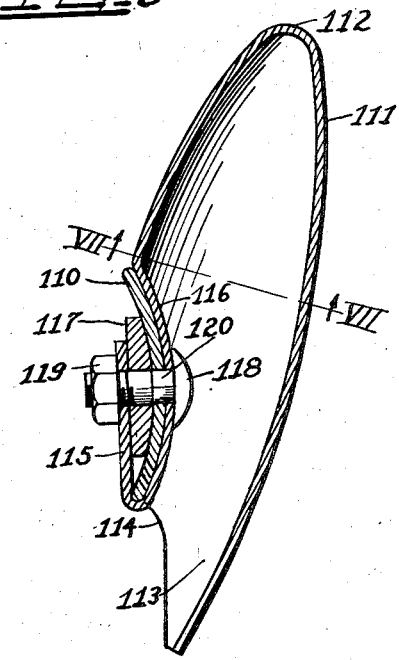
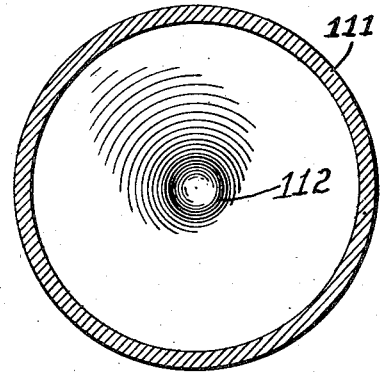
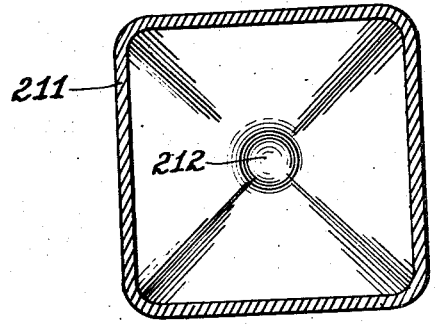
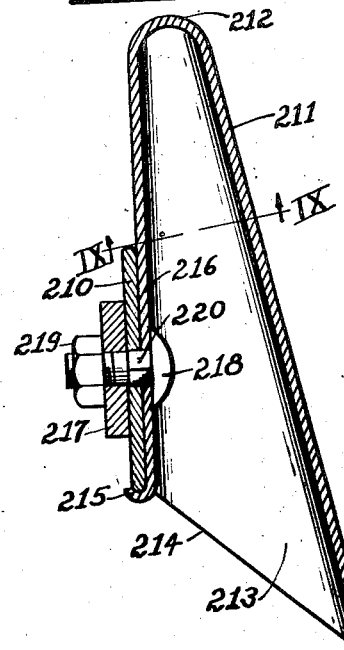
Inventor
George Albert Lyon.
by Charles Hill
Attys.

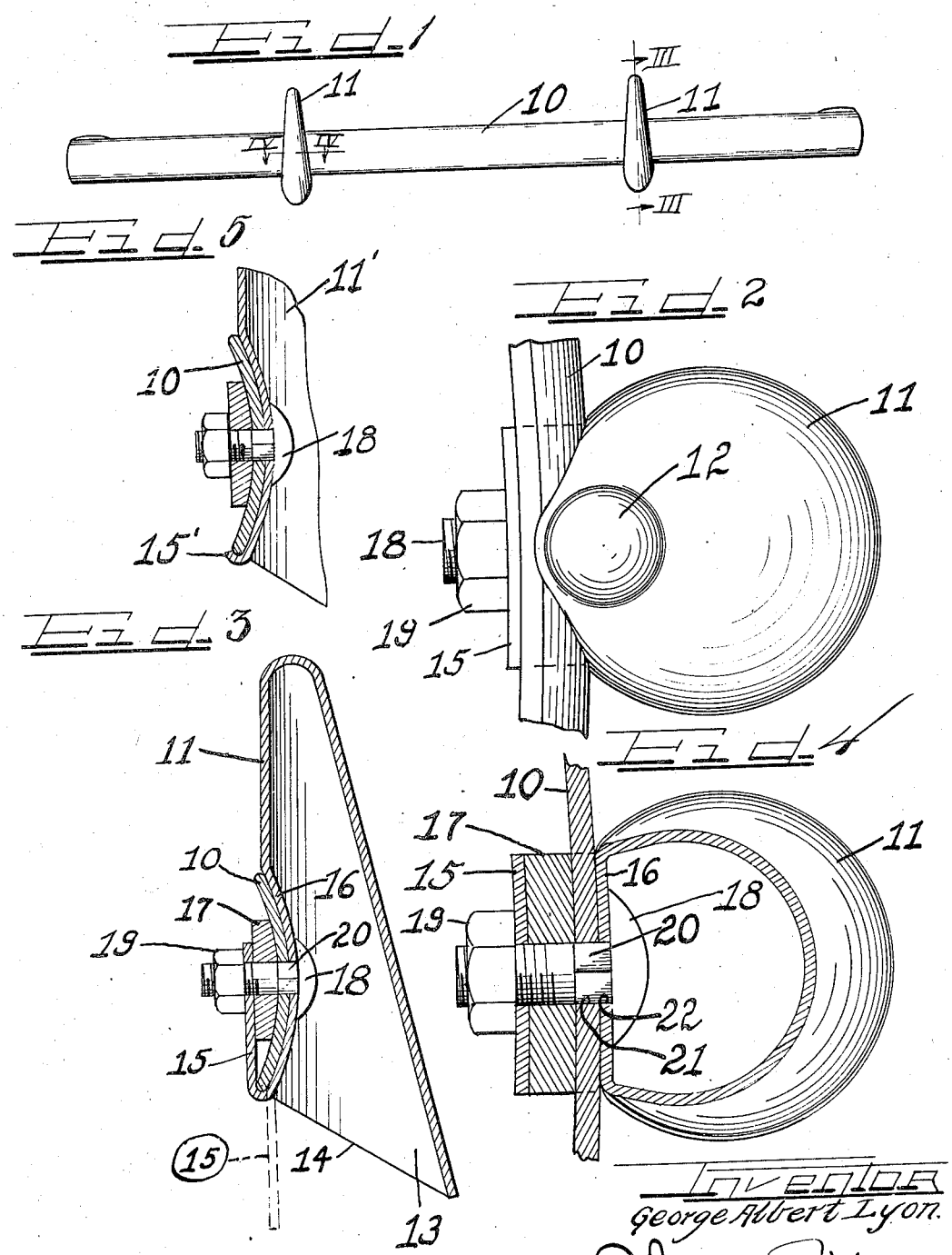

Patented Nov. 16, 1937

2,099,212

UNITED STATES PATENT OFFICE 2,099,212

BUMPER GUARD

George Albert Lyon, Allenhurst, N. J.

Application July 30, 1935, Serial No. 33,895

4 Claims. (Cl. 293—55)

This invention relates to bumpers, and more particularly to an improved bumper guard for attachment to a horizontal bumper bar.

An object of this invention is to provide a simplified bumper guard of improved appearance for attachment in a vertical position to a horizontal vertical bumper bar, and which guard is of such length as to extend above and below the bumper bar to prevent other bumper bars from riding over or under the bar to which it is secured.

Another object of this invention is to provide a bumper guard with improved fastening means which is normally concealed by the guard and which is accessible from the interior of the guard.

Still another object of the invention is to provide a bumper guard of the foregoing type having a relatively long hollow metallic body so formed at its place of securement to the bumper bar as to provide a relatively rigid abutment which is arranged to resist spreading and distortion of the hollow body.

In accordance with the general features of this invention, there is provided a bumper guard comprising a relatively long hollow metallic member having a portion of its rear side flattened to provide a relatively rigid shoulder for abutting the bumper bar, the member being closed at its upper end and having an opening in its bottom through which fastening means may be introduced for securing the bumper guard to a bumper bar.

Another feature of the bumper guard relates to the forming of the lower end of the bumper guard with an upwardly turned rearwardly disposed portion to embrace the rear side of the bumper bar to which it is attached.

A further and additional feature of the invention relates to the forming of the bottom of the bumper guard so that it is cut rearwardly and upwardly in an inclined plane to provide the lower end of the guard with an opening of a size large enough to permit of the introduction of a fastening element inside of the guard for securing the guard to the bumper bar.

Other objects and features of this invention will more fully appear from the following detail description, taken in connection with the accompanying drawings, which illustrate several embodiments thereof, and in which:

Figure 1 is a front view of a bumper bar showing a pair of my novel bumper guards applied thereto;

Figure 2 is an enlarged plan view of one of the bumper guards shown in Figure 1, the bumper bar being broken away;

Figure 3 is an enlarged vertical sectional view taken on the line III—III of one of the bumper guards shown in Figure 1, and also illustrating in dotted lines the position of a cut out portion of the lower end of the guard prior to its being turned upwardly upon the guard.

Figure 4 is an enlarged fragmentary cross sectional view taken on the line IV—IV of another one of the guards shown in Figure 1, which illustrates more in detail the securing means and which at the same time shows that the other bumper guard is identical to the one shown in section in Figure 3.

Figure 5 is a sectional view corresponding to a portion of Figure 3, but differing therefrom in that it shows a modification in which the turned back portion is shorter and merely engages the lower edge of the bumper bar.

Figure 6 is a vertical sectional view similar to Figure 3, but illustrating a modified form of the guard.

Figure 7 is an enlarged transverse sectional view taken on the line VII—VII of Figure 6 looking upwardly.

Figure 8 is a vertical sectional view somewhat similar to Figure 6, but taken through a modified form of a bumper guard; and Figure 9 is an enlarged transverse sectional view taken on the line IX—IX of Figure 8 looking upwardly.

As shown on the drawings:

The reference numeral 10 represents generally a horizontal bumper bar of a conventional automobile bumper. Applied to this bar are a pair of spaced bumper guards 11—11 which are identical in construction and which embody the features of this invention. The purpose of these guards as is well known is to prevent other bumpers from riding over or under the bumper bar 10. Since these guards are identical, a description of one will suffice for both.

Each of these bars includes a relatively long hollow metallic body which in the first form of the invention illustrated in the drawings, is shown as being of conical shape. This body has a closed upper end 12 and an open lower end 13. The body may be made in any suitable manner, such for example as by blanking, spinning, die casting, etc. it from suitable metallic material. I have obtained excellent results by making it from sheet steel and find that it may be formed either by blanking it progressively from a sheet of steel, or by spinning it on a suitable apparatus.

The lower open end 13 of the guard 11 is cut rearwardly and upwardly in an inclined plane, as indicated by the reference numeral 14 in Figure 3. In this cutting operation a piece of metal 15, shown in dotted lines in Figure 3, is left attached to the guard to be used as a fastening part. This part 15 is turned back upon the guard 11 so as to be spaced from the guard and yet at the same time provides a U-shaped construction for accommodating the bumper bar 10, upon the guard being slipped upwardly onto the bumper bar 10.

A portion of the rear side of the guard 11 opposite the turned back part 15 is flattened into a convexly shaped shoulder or seat 16 for abutting the outer surface of the bumper bar. This seat 16 is depressed into a shape or curvature conforming with the transverse curvature of the outer surface of the bar 10.

The turned up part or portion 15 embraces the lower edge and rear surface of the bumper bar 10 and also the rear side of a spacer 17 disposed between the part 15 and the bumper bar 10. This structure is held together by a bolt 18 inserted through apertures in the engaged parts and having an external nut 19 for tightening the parts together. The head of the bolt is disposed on the interior of the guard and engages the inner surface of the depressed portion 16. The nut 19 is disposed at the rear of the guard and bumper bar and is tightened against the resiliency of the turned up part 15 so as to cause all the parts to be drawn tightly together.

In order that the bolt may be kept from turning, it may be provided with a squared portion 20 on its shank for engagement in a square aperture 21 in the bumper bar 10, and a square aperture 22 in the depressed portion 16.

The opening in the lower end 13 of the guard is of such a dimension as to permit of the introduction of the bolt 18 into the interior of the guard so that the shank of the bolt may be passed through the alined apertures in the parts of the assembly.

In Figure 5 I have illustrated a slight modification in which the turned up part 15' on the bumper bar 11' is much shorter than the part 15 and merely engages the lower edge of the bumper bar 10. The parts of this modification are held together by a bolt 18 in the same manner as in the form of invention shown in Figure 3. With the exception of the difference noted the structure illustrated in Figure 5 is the same as the structure described in the first four figures.

At this time I wish to call attention to the fact that by providing the rear surface of the hollow bumper guard 15 with a depressed concave portion 16, I not only provide a seat or an abutment for cooperation with the bumper guard, but in addition thereto, I provide a relatively rigid transverse portion which acts to resist spreading and distortion of the hollow guard upon the same striking an object. In other words, the transverse depressed rear section 16 reenforces and strengthens the hollow metallic body of the guard.

In the forms of the invention described thus far the hollow guard has a conical shape and is disposed in such a position that one of its sides extends vertically upward from the bumper bar 10.

As distinguished from this structure in the form of the invention shown in Figures 6 and 7, which will now be described, the hollow bumper guard extends obliquely forward from the bumper guard. That is to say, the rear face of the guard does not extend in a vertical plane upwardly from the bumper bar, but extends obliquely forward from the bumper bar. The hollow guard is designated generally by the reference numeral 111 and has a conical shape somewhat similar to the head of a cartridge.

As in the other forms of the invention, the hollow body 111 has an enclosed upper end 112 and an open bottom 113 cut on a diagonal or bias line 114. By cutting the lower end 113 of the guard on a diagonal line 114, I have been able to provide for the turned back part 115 which engages the lower edge and rear surface of the bumper bar 110. Also the hollow guard is provided with a depressed concave rear portion 116 which embraces the outer surface of the bumper bar 110. The guard is held on the bumper bar by means of a single bolt 118 having threaded on its free end a nut 119 which presses the turned back part 115 against a spacer 117. The bolt 118 has its shank provided with a squared portion 120 disposed in squared apertures in the part 116 and bar 110.

The present form of guard is mounted on a bar in the same way as the previously described forms. In other words, it is slipped upwardly over the bar so that the bar is disposed in the U-shaped structure, which is provided by reason of the turning of part 115 back over the body of the guard. Thereafter, the bolt 118 is inserted upwardly through the open end 113 and is disposed in the alined apertures. Upon the screwing of the nut on the bolt the bumper guard is securely attached to the bumper bar.

In Figures 8 and 9, I have illustrated still another modification of the invention in which the hollow bumper guard 211 is vertically wedge-shaped but has a square or polygonal cross section. The guard has a closed upper end 212 and a lower open end 213 cut on an inclined plane as indicated at 214. A rear edge of the guard is turned rearwardly at 215 to embrace the lower edge of the bumper bar 210 and thus to aid in the positioning and holding of the guard on the bar as is also true in the other forms.

Inasmuch as the sides of the guard are already formed flat, it is not necessary to provide this form with a flattened portion. In fact, the rear side 216 of the guard is located so as to abut the outer surface of the bumper bar 210 and is held against this surface by means of a single central bolt 218. This bolt has a squared portion 220 on its shank, which fits in correspondingly squared apertures in the side 216 and the bar 210 to prevent turning of the bolt. A nut 219 is threaded on the end of the shank of the bolt and is screwed tightly against a spacer 217 disposed between the rear surface of the bar 210 and the nut 219.

In all forms of the bumper guard described hereinabove I have provided in addition to the fastening bolt a turned portion for engaging the lower edge of the bumper bar. This turned portion resists displacement of the guard from its vertical position on the bar and enables some of the stresses to which the guard may be subjected in use to be imposed on the lower edge of the bumper bar, whereby the bolt is not subjected to all the stresses.

Now I desire it understood that while I have described and illustrated in detail several embodiments of the invention, the invention is not to be thus limited but only in so far as defined by the appended claims.

What is claimed is:

1. A one-piece hollow bumper guard of conical form adapted to be secured on the front of a bumper bar and with its closed apex projecting above the bar, said guard having a depressed portion on the rear side thereof and at the lower end thereof to provide a seat for the front face of a bumper bar and to also stiffen said guard against spreading and distortion under impact.

2. A hollow bumper guard of conical form adapted to be secured on the front face of a bumper bar and with its closed apex projecting above the bar, said guard having a portion on the rear side thereof and at the lower end thereof shaped to provide a seat for the front face of a bumper bar, and a reversely bent and integral resilient lip on the rear side of said guard cooperable to provide a resilient clamp for a bumper bar placed between said lip and said seat.

3. A hollow bumper guard of cupped form adapted to be secured on the front face of a bumper bar and with a closed top projecting above the bar, said guard having a portion on the rear side thereof and adjacent the lower end of the rear side shaped to provide a seat for the front face of a bumper bar, said guard being also shaped to present side and front impact faces extending below the rear face of said guard.

4. A hollow bumper guard of cupped form adapted to be secured on the front face of a bumper bar and with a closed top projecting above the bar, the rear side of said guard being apertured near the lower end of said rear side, and means insertable through the open and lower end of said guard and through the aperture to secure said guard at its rear face against the front face of a bumper bar.

GEORGE ALBERT LYON.